US011436337B2

(12) United States Patent
Ionescu et al.

(10) Patent No.: US 11,436,337 B2
(45) Date of Patent: *Sep. 6, 2022

(54) SYSTEM AND METHOD FOR APPLICATION SECURITY PROFILING

(71) Applicant: ShiftLeft Inc., Santa Clara, CA (US)

(72) Inventors: Vlad A Ionescu, Santa Clara, CA (US); Fabian Yamaguchi, Santa Clara, CA (US); Chetan Conikee, Santa Clara, CA (US); Manish Gupta, Santa Clara, CA (US)

(73) Assignee: ShiftLeft Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/912,189

(22) Filed: Jun. 25, 2020

(65) Prior Publication Data
US 2020/0394313 A1 Dec. 17, 2020

Related U.S. Application Data

(63) Continuation of application No. 15/994,076, filed on May 31, 2018, now Pat. No. 10,740,470.

(60) Provisional application No. 62/512,728, filed on May 31, 2017.

(51) Int. Cl.
*H04L 29/06* (2006.01)
*G06F 21/57* (2013.01)
*G06F 21/56* (2013.01)

(52) U.S. Cl.
CPC .......... *G06F 21/577* (2013.01); *G06F 21/563* (2013.01); *G06F 2221/033* (2013.01)

(58) Field of Classification Search
CPC ............ H04L 9/16; H04L 9/0618; G09C 1/00

USPC .......................................................... 380/28
See application file for complete search history.

(56) References Cited

U.S. PATENT DOCUMENTS

| 5,950,003 | A | * | 9/1999 | Kaneshiro ........... G06F 11/3612 717/130 |
| 9,280,442 | B1 | | 3/2016 | Nicolo |
| 9,652,358 | B1 | * | 5/2017 | Spoon ................ G06F 11/3604 |
| 9,658,835 | B1 | | 5/2017 | Venkataraman |
| 10,515,212 | B1 | | 12/2019 | McClintock et al. |
| 2007/0240138 | A1 | | 10/2007 | Chess et al. |
| 2008/0256518 | A1 | | 10/2008 | Aoshima et al. |
| 2009/0307664 | A1 | | 12/2009 | Huuck et al. |
| 2010/0017868 | A1 | | 1/2010 | Hao et al. |
| 2010/0083240 | A1 | | 4/2010 | Siman |

(Continued)

FOREIGN PATENT DOCUMENTS

CN  100461132 C  2/2009

OTHER PUBLICATIONS

Yamaguchi, Fabian, "Modeling and Discovering Vulnerabilities with Code Property Graphs", University of Gottingen, Germany, Qualcomm Research Germany, Feb. 2, 2015, "https://www.researchgate.net/publication/263658395_Modeling_and_Discovering_Vulnerabilities_with_Code_Property_Graphs".

*Primary Examiner* — Evans Desrosiers
(74) *Attorney, Agent, or Firm* — Alpine Patents LLC; Brian Van Osdol

(57) ABSTRACT

A system and method for application security profiling that includes extracting a code property graph from at least a subset of a code base; generating a code profile from the code property graph, wherein generating the code profile occurs prior to a compilation of the code base; and applying the code profile, comprising of identifying sections of interest within the code base.

19 Claims, 8 Drawing Sheets

(56) References Cited

U.S. PATENT DOCUMENTS

| | | |
|---|---|---|
| 2010/0192220 A1 | 7/2010 | Heizmann et al. |
| 2011/0083190 A1 | 4/2011 | Brown et al. |
| 2012/0102474 A1 | 4/2012 | Artzi et al. |
| 2013/0031531 A1* | 1/2013 | Keynes .................... G06F 8/74 717/126 |
| 2013/0160130 A1 | 6/2013 | Mendelev et al. |
| 2014/0019490 A1 | 1/2014 | Roy et al. |
| 2014/0143827 A1 | 5/2014 | Edery et al. |
| 2014/0282853 A1 | 9/2014 | Velammal et al. |
| 2016/0224790 A1 | 8/2016 | Gupta |
| 2016/0352769 A1 | 12/2016 | Bryant et al. |
| 2017/0063910 A1 | 3/2017 | Muddu et al. |
| 2017/0091470 A1 | 3/2017 | Infante-Lopez |
| 2017/0206082 A1 | 7/2017 | Abadi et al. |
| 2017/0316202 A1 | 11/2017 | Roichman |
| 2018/0349614 A1 | 12/2018 | Ionescu et al. |
| 2019/0005163 A1 | 1/2019 | Farrell et al. |
| 2019/0108342 A1 | 4/2019 | Conikee et al. |
| 2019/0171846 A1 | 6/2019 | Conikee et al. |
| 2020/0159934 A1 | 5/2020 | Yamaguchi et al. |

* cited by examiner

SYSTEM AND METHOD FOR APPLICATION SECURITY PROFILING

CROSS-REFERENCE TO RELATED APPLICATIONS

This Applications is a Continuation Application which claims the benefit of U.S. patent application Ser. No. 15/994,076, filed on 31 May 2018, which claims the benefit of U.S. Provisional Application No. 62/512,728, filed on 31 May 2017, both of which are incorporated in their entirety by this reference.

TECHNICAL FIELD

This invention relates generally to the field of software security, and more specifically to a new and useful system and method for application security profiling.

BACKGROUND

Security is an important element of any piece of software. With expanding reliance on digital services and applications, the world is seeing that security flaws can lead to serious problems when exploited. Compounding the problem of better security is that the software development space has evolved away from the current security solutions. Companies have faster development cycles, more frequent code pushes, heavy reliance on open source software, and use SaaS/cloud hosting. These new patterns can break traditional security models and processes. Thus, there is a need in the software security field to create a new and useful system and method for application security profiling. This invention provides such a new and useful system and method.

DESCRIPTION OF THE EMBODIMENTS

Figure 1:
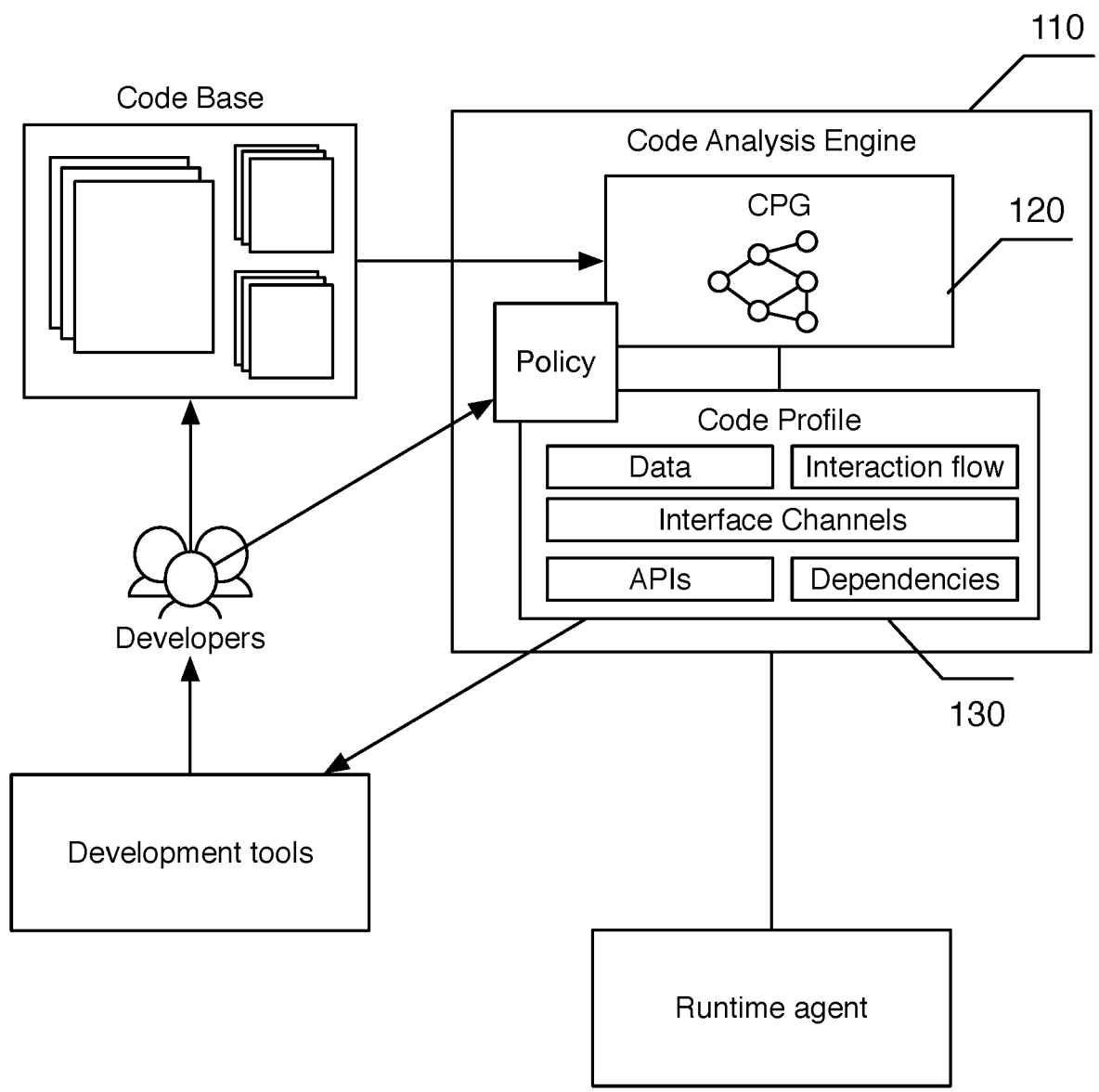
FIG. 1 is a schematic representation of a system of a preferred embodiment.

The following description of the embodiments of the invention is not intended to limit the invention to these embodiments but rather to enable a person skilled in the art to make and use this invention.

1. Overview

A system and method for application security profiling of a preferred embodiment functions to apply an understanding of the underlying structure and security exposure of code. The system and method preferably involve the generation of a code profile that characterizes the context of code execution and its interactions with other dependencies or interactions with other outlets (e.g., a network or memory). The code profile can be used in understanding the attack surface of code. Feedback during development can be used to reduce that attack surface. Additionally, the understanding of the attack surface may also be used in securing runtime execution and allow for dynamic modification of the application or service. The system and method can be used in understanding the state of a base code, altering development in consideration of this information, and/or having precision protection targeting the known threat vectors.

The system and method can preferably be used to enable various tools and services. As one exemplary application, the system and method can more efficiently enable security profiling of a code base during development. This could enable developers to more efficiently evaluate security impact of changes to a code base. As another exemplary application, the system and method can enable a security team to assess the security state of a code base when deployed. As yet another exemplary application, the system and method may be used by a runtime agent in enforcing or otherwise acting on insights gained from the security profiling to alter application execution. Other suitable applications could similarly be used.

As a one potential benefit, the system and method can be used for the generation of a semantic representation of a code base in the form of a code profile. The code profile may be used to understand the security posture of that base code. This could be useful for developers and teams to analyze their own code, but could additionally facilitate better security implications of outside libraries and open source projects.

Similarly, the system and method may provide a contextual understanding of code that can offer insights into actual security risks of a particular application. For example, a process that writes data to storage will pose no threat when the data does not contain sensitive information, but could be a vulnerability if that process handles sensitive data. A contextual understanding would enable a more focused approach to security, avoiding an all-encompassing vulnerability analysis that may be time and resource intensive and not necessarily as effect as a focused approach.

As another benefit, the system and method cannot only provide code analysis tools but can apply the code profile to security enforcement during runtime execution.

As another potential benefit, the system and method may accelerate the rate at which a code base may be secured during deployment using customized security protection. An understanding of the attack surface can be understood during development and immediately applied to protecting the specific attack surface of the code base. The system and method can alleviate dependence on time-consuming processes that involve building a specialized security model based on actual usage. Additionally, as the code base changes, the immediate impact to the attack surface can be understood, which can translate to immediate adjustment in securing a runtime.

The introduction of a faster feedback loop on security impact can enable enforcing policy that maintains a consistent security posture or positioning. In other words, the system and method can enable a policy engine to guide development so that the attack surface is kept within certain constraints.

As yet another benefit, the system and method can alter the development process such that developer teams, devops teams, and security teams more cooperatively work to produce secure services and applications. In a related benefit, the security impact of individual developers can be understood because of the ability to evaluate the security delta in a code profile for incremental changes to the code base.

In one specific benefit, the system and method can enable a security-aware mechanism for working with libraries or other dependencies. Use of open source software libraries or third party code is widely used in software development. However, few developers have the time to do a full audit of the security vulnerabilities associated with a library. Furthermore, a library itself may have no explicit vulnerabilities but could introduce vulnerabilities when integrated with a particular codebase based on the nature of that usage. As in the example above dealing with writing data to storage, a library that writes data to storage may, in isolation, pose no threat. However, if a codebase passes sensitive data to that library that particular use of the library could introduce an attack vector and vulnerability for accessing sensitive data. This system and method could enable the creation of 'transitive security-profile chaining'. Application(s) depend on libraries and libraries depend on other libraries. Application (s) execute upon frameworks and frameworks depend on other libraries. This system and method provides the ability to recursively compute security-profile across the entire transitive chain and also in an aggregate, compute the overall profile of the representative application (across scope of utilized frameworks and dependent libraries).

In addition to security benefits, the system and method may provide additional legal benefits. The system and method may additionally generate compliance documentation that can be submitted for audits and used to demonstrate compliance with national and/or international regulations.

2. System

As shown in FIG. 1, a system for application security profiling of a preferred embodiment can include a code analysis engine 110 configured to produce a code property graph 120 and a resulting code profile 130. The system may additionally include one or more development tools and/or a runtime agent that can utilize the code profile 130 in augmenting the development process, enhancing deployment monitoring, and/or securing execution.

The code analysis engine no functions to generate a code profile 130 from source code or a subset of the source code. The code analysis engine 110 may alternatively convert a subset of one or more source codes (referred to as base code) into a code profile 130. As many applications rely on libraries and open source software, the code analysis engine no can facilitate generation of a code profile 130 that can account for security impact of third party code bases. For example, the code analysis engine 110 could assess the code bases of various open source libraries and a main project.

The code analysis engine 110 preferably includes a first code analysis tool that extracts code property graph (CPG) 120. The CPG represents operational relationships such that execution and data flow can be traced through the base code and its constituent frameworks and libraries (i.e., dependencies). The CPG can be used to characterize potential vulnerabilities. The code analysis engine 110 preferably includes a second code analysis tool that traverses the CPG and generates a code profile 130 using the relationships and execution and data flows within the CPG.

Figure 2:
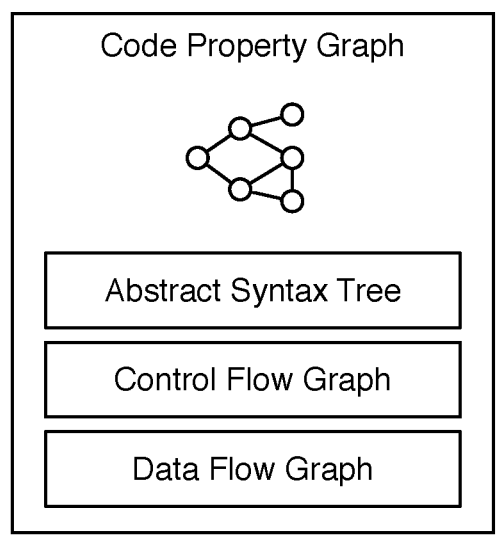
FIG. 2 is a schematic representation of a code property graph.

The code property graph 120 of a preferred embodiment is a joint data structure, or model, composed of an abstract syntax tree (AST) subcomponent, a control flow graph (CFG) subcomponent, and a data flow graph (DFG) subcomponent as shown in FIG. 2. The joint data structure CPG may include a node for each subcomponent for each subject and predicate the base code. The CPG preferably enables efficient processing and analysis of the base code by enabling efficient graph traversals. The CPG is preferably a serializable data structure, which can enable efficient generation, transmission, and distribution of the code profile 130 across various machines. Being easily transmitted can enable parallelized processing of the CPG, which can be leveraged in efficient traversal of the CPG in analysis of interaction flows between various points of interest in the codebase. A CPG can additionally be established for different segments and/or dependencies of the code base. For example, CPGs can be extracted from libraries that are called by the code base and/or distinct subcomponents of the code base. Extracting a CPG for these different segments may additionally help focus and identify locations of interest within the code base. For example, a library CPG may help identify a code base variable that has gone out of its valid parameter range.

An AST functions to characterize the structure and syntax of the code. An AST faithfully encodes how statements and expressions are nested to produce programs. A code parser can create an AST as an ordered tree where inner nodes represent operators and leaf nodes match operands.

The CFG functions to characterize the functional flow of execution within the code as well as conditions that need to be met. The control flow graph can preferably represent sequential and/or possible sequences of execution. The CFG is comprised of statement and predicate nodes, which are connected by directed edges to indicate transfer of control. A statement node has one outgoing edge, and a predicate node has two outgoing nodes corresponding to true and false evaluation of the predicate. The CFG preferably characterizes the calls between functions in the code, the conditional branches within the code, and/or other elements of control flow. For example, a statement preceding an if-statement will have an association into the if-statement or over the if-statement within the CFG. The CFG may be used to determine the execution flow in base code.

The DFG functions to show the operations and statements that operate on particular pieces of data. Traversing the edges of the graph can indicate the flow of data. The DFG can additionally capture possible operations.

The AST, CFG, and DFG are preferably combined into a joint data structure as the CPG. The three graphs AST, CFG and DFG each have nodes that exist for each statement and predicate of the source code. The statement and predicate nodes can serve as a connection point of the three graphs when joining to form the CPG. Through the three subcomponents, CPG may contain information about the processed code on different levels of abstraction, from dependencies, to type hierarchies, control flow, data flow, and instruction-level information. Passes over the CPG may allow inspection of the base code structure, control flow, and data dependencies of each node, and thus traversing and/or making queries into the CPG may give better understanding of the code base (e.g., by identifying vulnerability patterns).

The system may additionally employ a query language for the CPG. The CPG query language can be used to formulate data-flow patterns (e.g., vulnerability patterns). These data-flow patterns may be placed into a non-interactive script to automatically scan for vulnerability patterns.

For general data-flow related vulnerabilities, the system may preferably employ a policy. The policy may define methods that introduce data into the application, sensitive operations, and data-flow that should be reported. The security policy may be a more concise method of identifying generally sensitive operations. The policy may additionally allow data transformations and checks to be specified in order to report flows of data (e.g., performing checks for only unvalidated data).

The policy of a preferred embodiment functions as a specification of how the application communicates with the outside world. In some variations, the policy and/or policy specifications may be preferably incorporated into the code profile 130. The policy may include support for core language features libraries, and frameworks via policy files. The policy may include additional or alternative features that provide general, or specific, specifications for the application. The policy may additionally, or alternatively, specify which transformations exist on data, and which information flows should be considered for security violations. Policy files may be employed as pre-made policy packages. For example, default policy rules from a policy database or user created custom policies may be used. Policies may additionally be created from analysis of the code profile 130 of the base code, from dependent modules or libraries, or any alternative base code related object. Policies may additionally be updated and modified as seen fit. Policies may preferably be comprised of four types of directives: Tagging directives, flow descriptions, sensitive-data directives, and/or taint semantic directives. Policies may additionally contain other high level directives. Policies may additionally or alternatively be of a different type of directive.

Additionally, a policy may include as a component a tagging directive. Tagging directives can be used to inform a code analysis engine 110 about invoked library methods that may read from the outside world or write to it. Tagging directives may encode pre-tagging patterns onto the code property graph 120 with a set of predefined tags that the analysis engine can pick up. For example, interface interactions, transformations, and exposed methods, can be determined by tagging the CPG 120 based on syntax-patterns, which are then encoded using the policy tagging directives. Other predefined tagging patterns may additionally or alternatively be tagged onto the CPG 120. Tagging directives may preferably follow the same language within the policy language format.

An interface interaction directive may be a type of tagging directive. Interface interaction directives may be employed to describe the effects of calls to external libraries. Thus, interface interaction directives (or IO directives) may tag data sources and sinks.

A transformer directive may be another type of tagging directive. Transformer directives may be employed to specify methods that transform data or may be considered data validation routines. For example, a method "encodeBase64" may take an input string as an argument and return a base64-encoded version of the string. The behavior of this method may be captured by a transformer directive. Transformer methods can also be used to model validations of input arguments. For example, a transformation method may be implemented by a user to specify that a string that a string is considered validated if it passes a string comparison.

An exposed directive may be another type of tagging directive. Exposed directives are used to mark methods which can be triggered by outside attackers.

The policy may include flowing directives as another possible component of the policy. Flow directives specify patterns for information flows that, when observed, may be reported as possible instances of vulnerabilities (e.g., data leak). The tagged data of the tagging directives may be combined into a flow description of the system Tagging directives identifying data sources, sinks, and transformers may describe data flow. The policy language may preferably have a format to combine the tagging directives into flow directives. Flow directives may capture specific data flow(s) (e.g., unencrypted http data flow, ftp data flow, unencrypted data flow, etc.), or may additionally or alternatively capture all flow. Moreover, it may be possible to restrict tags and capture flows. For example, all flows where attacker-controlled data enters the application via HTTP and remains attacker-controlled throughout the entire flow can be captured. Both sources and sinks may also be restricted (e.g., to capture flows from files to http). Additional restrictions and modifications may also be captured by flow directives.

The policy may include sensitive-data directives as another possible component of the policy. Sensitive-data directives function to identify application specific sensitive data. General sensitive-data may preferably be identified by natural language processing techniques to identify sensitive data elements based on variable, field, and parameter naming. Sensitive-data directives may allow sensitive data to be identified heuristically. A user may specify variables that are to be treated as sensitive for their applications. The default dictionary may then be extended via sensitive-data directives, and this extended dictionary may be incorporated into the policy.

The policy may include taint semantics as another possible component of the policy. Taint semantics may function as maps between method input and output parameters that express propagation of taint. Policies may define taint semantics at the lowest level of abstraction, which may be stored in a CPG 120, and can be accessed by static taint tracking algorithms. Library methods may simply propagate taint without performing any transformations on the data that change its security properties. For standard libraries, taint semantics propagation rules may preferably be incorporated into standard/default policies. However, for less commonly used, or unique, libraries propagation rules may be manually specified via MAP directives. These directives specify how taint is propagated from the input parameters of a library method to its output parameters.

The code profile 130 functions as a manifest interpretation of the components of the code that can have security and functional implications. The code profile 130 may be generated from the CPG 120. Code analysis and interpretation of the code profile 130 can detect certain parts of the code that have some implication on the data type, handling of data, and interactions with outside systems or code, giving contextual understanding of the base code. The code profile 130 can preferably be broken down into a set of components that in combination can encapsulate the attack surface of the code. The code profile 130 could include components broken down by: interface channels, data, interaction flows, dependencies, and/or API elements. Additional or alternative components may additionally be used. For example, the code profile 130 could break down the various interface channels to outside systems, instances of data of interest, the various interaction flows of data to different interface channels, and dependencies on external libraries. Some of the components may be more applicable to certain types of code bases (e.g., libraries vs. web applications).

The code profile 130 may be generated from CPG 120 using the code analysis engine 110. The graph structure of the CPG 120 may convert a code analysis problem into a graph theory problem, potentially reducing the computational power required to solve the problem. That is, because of the graph structure code analysis may be done using parallel processing in clusters and allow for more efficient caching of data. Interface interactions of the code profile 130 may be generated by tracing the flow of interfaces on the CFG component of the CPG 120. Data interactions of the code profile 130 may be determined tracing the flow of data on the DFG component of the CPG 120. In some variations, where there is a code policy, the code profile 130 may be generated conjointly from the CPG 120 and the policy. In these variations, the code analysis engine no generates the code profile 130 from the CPG 120 according to the specifications of the security profile. The CPG 120 can be evaluated against the security profile. To this end, the code analysis engine 110 performs static data and flow analysis to determine data and flows in the application that violate or otherwise meet conditions or rules of the security profile. The security profile may be a default profile, a customized security profile, and/or a combination of security profiles. In one variation, a baseline security profile could be used in combination with a customer defined security profile. Parts and/or all of the code policy itself may also be incorporated into the code profile 130.

The code profile 130 may be generated for a particular scope of code, but code profiles 130 could additionally/and or alternatively exist for subcomponents of the base code. Thus, a code profile 130 may be generated for an entire base code, or for one or more sections of code (e.g., a code profile 130 for a specific function within the code). Additionally, code profiles 130 may be generated for dependencies of the base code, such as modules, and external libraries that are called on by the base code. Any other variations or alternatives of the base code and/or base code dependencies may also be implemented to generate a code profile 130. Additionally, nested hierarchies of code profiles 130 may also be generated, wherein potentially overlapping code profiles 130 for a subset of the base code and/or a code profile 130 for the entire base code are created. Nested code profiles 130 can enable someone to see, with greater focus, the impact of sections of the base code.

The interface channels function to characterize the input/output associated operations of the codebase. Interface channels may represent every way the base code interacts with the outside world. The interface channels of the code of interest are preferably described within the code profile 130. A codebase (or process) will have at least one interface channel component if the codebase has a statement establishing communication with an outside system. An interface channel component can output data to an outside system and/or receive data from an outside system. An interface channel could be contained directly within the codebase (e.g., a process of the codebase accesses or interacts with a network, database, file, etc.) or indirectly (e.g., a used library or module accesses or interacts with a network, database, file, etc.).

Figure 3:
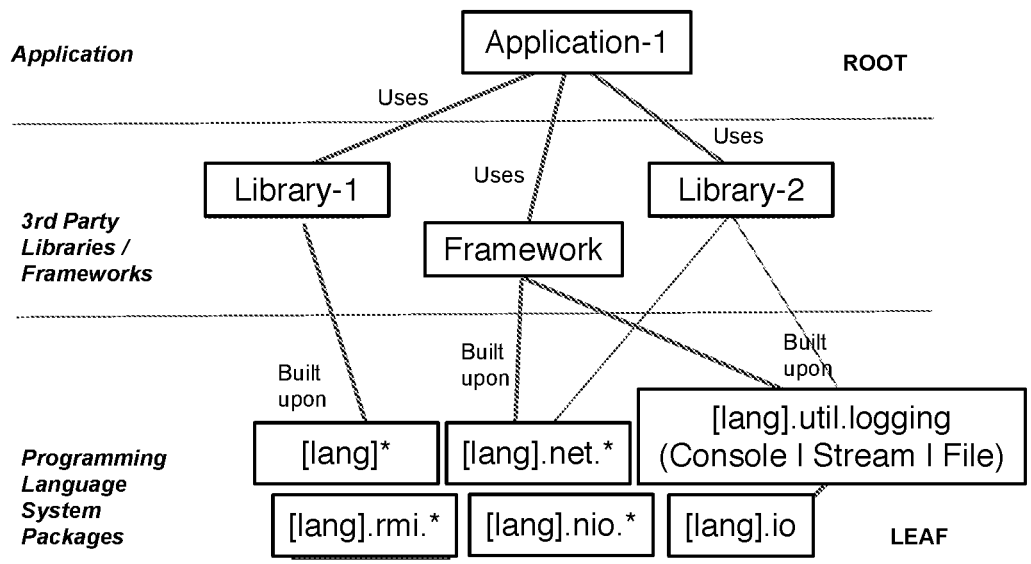
FIG. 3 is an exemplary graph of application associations to underlying statements that may be used in determining used interface channels.

In one implementation, interface channels can be identified by statements that are tagged or detected to perform some action with an outside system. The system may include a library of pre-tagged statements that the code profiler may use. Statements triggering system calls and/or other types of statements could be tagged as such. Generally, an interface channel can be detected by traversing the CFG from system call statements or other tagged statements and incorporated into the code profile 130. For example, an application could be detected to make use of a set of interface channels by tracing associations through libraries and frameworks to underlying system calls as shown in FIG. 3.

System calls are functionality exposed by the underlying operating system. There is usually a well-defined way for a language to interact with the underlying operating system. System calls are preferably incorporated into the code profile 130. System calls cannot be accessed directly by user programs, and are generally only accessed by kernel code. For example, the Linux kernel for the x86_64 processor architecture provides over 300 system calls. When a system call is made, there is a transition from user space to kernel space, which runs at a more privileged level. Arguments to the system call are copied into the kernel space and validated to ensure they do not compromise the kernel. However, it is highly likely that the parameters were validated in user space as well. In some cases, the user space functions will be thin wrappers over the kernel functions, in other times they'll provide additional features on top.

Instances of interface channel components can have attributes such as a type, read/write mode indication, description, address, method, protocol, data received, data sent, channels received from, channels sent to, and/or other suitable attributes.

Figure 4:
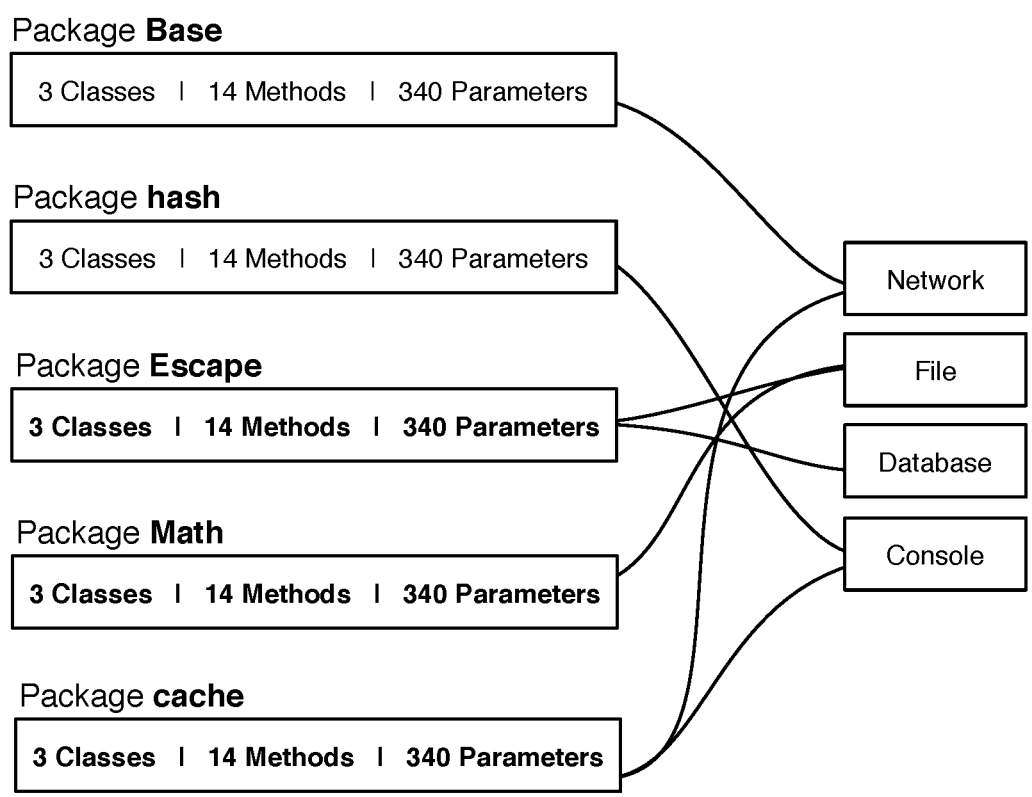
FIG. 4 is an exemplary graphical representation of a data profile.

The type of interface channel can be classified based on the type of interaction with an outside system. Five preferred types of interface channels can include: network, database, file, commands, and logging. By inspecting the interface channels of a code profile 130, one could see if some type of network access, database access, file, access, and command access is used. The code profile 130 could then break down interface channels of different processes by the type of interface channel as shown in FIG. 4. A network interface channel can be indicated by a statement using a webs route, a 3rd party API, reading from or writing to a queue or nearlines storage, and/or any other suitable network interaction. A database interface channel can be indicated by statements that perform interactions with a database. In some implementations, database interface channels may be combined with network interface channels. A file interface channel can be indicated by statements that read or write to a file system. Similarly, file interface channels could be a type of network interface channel (e.g., if a network file system), but can preferably be included as its own type, especially for local file system interactions. A command interface channel can be indicated by statements making commands to a database, to a file system, and/or other suitable types of commands. A logging interface channel can be indicated by statements that write data or generates reports of data, events, communications and/or other aspects in a system.

The data components function to identify particular types of data. The data components called out are preferably data that may have an impact on the attack surface of the code base. Data components will have a number of attributes such as type, template, and name.

The types of data components can include data classifications such as attacker controlled, sensitive data (credit card numbers, SSN, etc.), secrets (e.g., credentials, passwords, etc.), user data, personal identifiable information, user generated data, internal data, public data, and the like. The type of data component can be determined through pattern recognition on the codebase. Preferably, natural language processing can analyze class names, object names, structure names, variable names, runtime value patterns, data validation patterns, comments, documents, and/or other aspects to classify data. template property can indicate the type of object such as a class, object, structure, variable, or other form of data. Additionally, a data component can include attributes to indicate data flow to an interface channel, from an interface channel, to an interaction flow, or from an interaction flow. A data component could additionally include an attribute indicating if it is protected by authentication/authorization layer and the type or properties of protection (e.g., form-based authentication, basic authentication, 2-factor, token based, handling password resets, OAuth & OAuth 2, JWT, password strength policy, session cookie, crypto strength, etc.).

Sensitive data is preferably a data type of interest. Sensitive data may include credit card numbers, pin codes, SSNs, etc. Using natural language processing techniques and a default dictionary of indicative terms, sensitive data types may be identified by their name. Tagging directives may additionally be used to mark data as sensitive.

The interaction flow components function to represent the interaction of the profiled components such as the data and the interface channels. Interaction flows of the base code may be extracted to the code profile graph. Tracing the CFG of the code profile graph may allow tracking the flow of execution and tracing the DFG may allow tracking data, data relationships, and all uses of variables. By traversing the CFG and the DFG the flow data may be incorporated within the code profile 130. Depending on the modeling architecture, the flows can be modeled as independent components or as properties of the data and/or interface channels as was indicated above. An interaction flow can indicate the interaction channels from which data flows or to which data flows.

The dependency components function to represent the library, module, or other codebase dependencies. Dependencies may, additionally or alternatively, include internal dependencies. Dependencies may be incorporated within the code profile 130 from the CPG 120. Each dependency component may have attributes indicating properties like if its deprecated, classified as insecure or vulnerable, bus factored (high volume of committers added/leaving), unmaintained, license violation, or outdated.

The API components function to represent the exposed programmatic interfaces of the codebase. API components may be generated into the code profile 130 from the CPG 120. API components can be particularly applicable to a library, code module, or application that may expose programmatic interfaces for interactions by other parties. In a library, this can include the exposed function calls for users of the library.

The code profile 130 can additionally include codebase metadata such as language, type, framework (e.g., web-app or library), lines of code, committers, open issues, pending PRs, test coverage, and/or other properties.

The code profile 130 can additionally include additional or alternative components. In one variation, attributes of the code profile 130 may be abstracted into more user-accessible concepts. These higher-level constructs could be represented in the code profile 130. For example, compliance analysis or other forms of conclusions could be represented in these higher-level components.

The code profile 130 can offer a tangible artifact that is usable in understanding the nature of a base code. The code profile 130 can have a data-oriented representation, which could be accessible for programmatic interactions. The code profile 130 could additionally have a translated graphical representation that reflects properties of the code profile 130 in a way more easily observed by a user. This graphical representation could be presented in a dashboard or other suitable interface.

The system may additionally include a development tool, which functions to integrate the code analysis engine 110 and the resulting code profile 130 into a development process. In one variation, the development tool can be integrated with a code versioning system, such as git, such that the code profile 130 can be evaluated on code versioning events such as commits or pushes. Recalculating the code profile 130 can be efficient by mapping code changes to impacted changed in the CPG 120 and reevaluating the code profile 130 for those changes. In one implementation, code profile 130 changes could be shown prior to permitting a commit or push.

Additionally or alternatively, the development tool can have a development guideline engine that can enforce a set of desired security rules during development. The guidelines or rules used by the development guideline can be configured and/or automatically generated to define a target security posture of a code profile 130. The security posture establishes various conditions on what is permissible. For example, a guideline specification may be set to prevent personal identifiable information from flowing through a network interaction channel. The development guideline engine can validate that the development of a codebase stays within specific security properties.

The system may additionally include a runtime agent, which functions to secure execution of a deployment of the base code onto the code profile 130. The runtime agent is preferably deployed along with the application process that is the result of compiling and running the source code. The runtime can preferably enforce policy that is customized to the code profile 130 of the codebase. The runtime agent may additionally use the code profile 130 to take and draw conclusions about the system to facilitate runtime without inordinate amounts of time building a model.

3. Method

Figure 5:
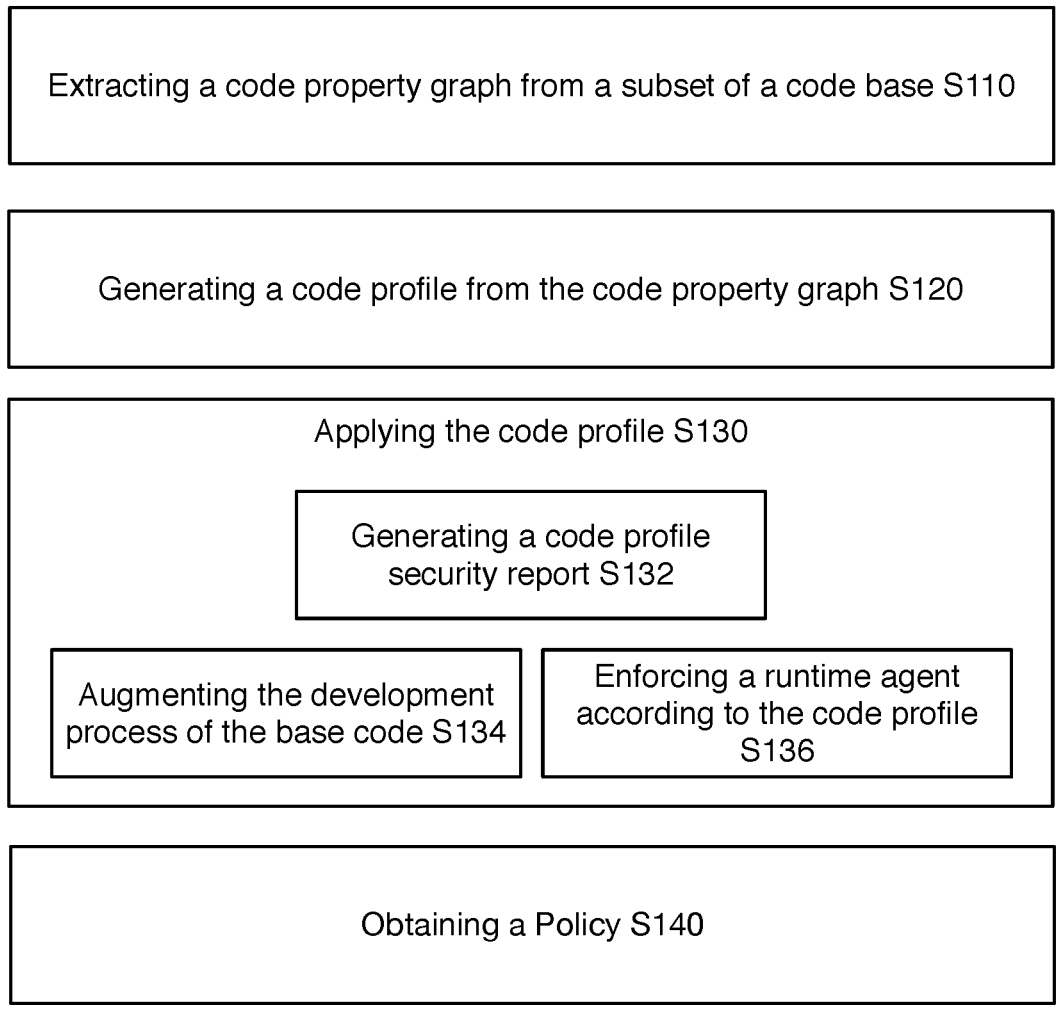
FIG. 5 is a flowchart representation of a method of a preferred embodiment.
Figure 6:
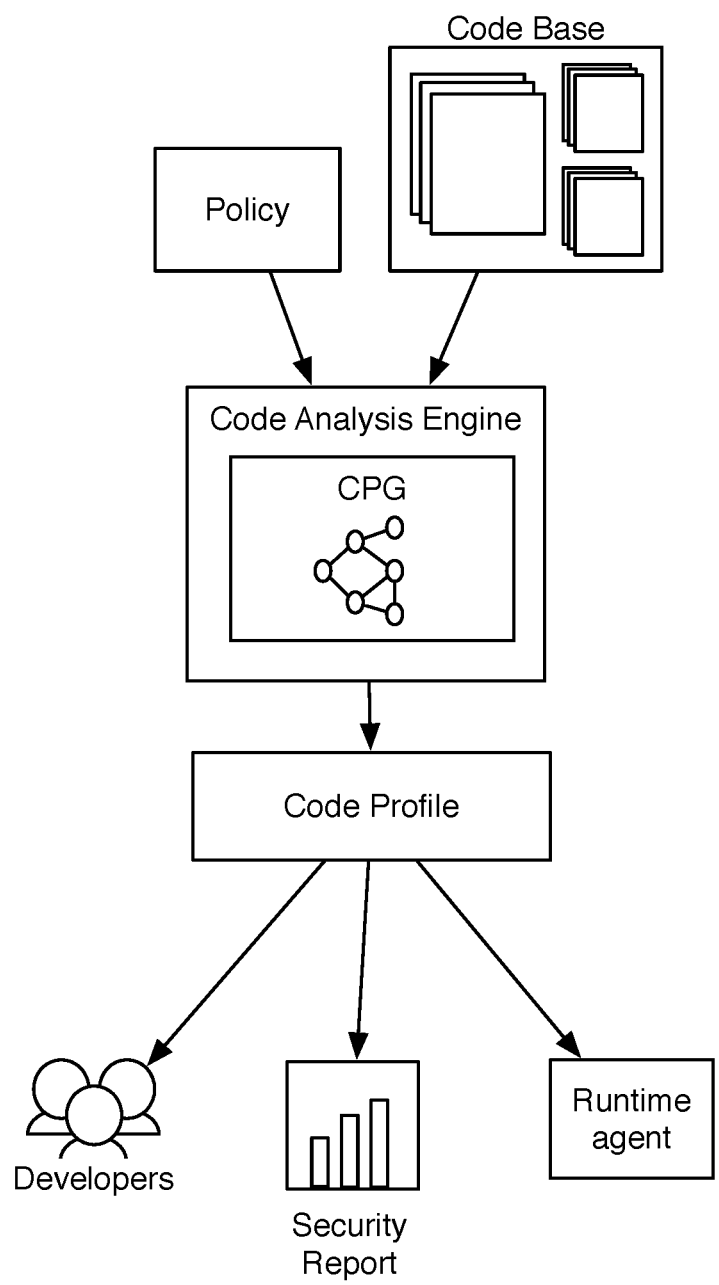
FIG. 6 is a schematic representation of using a policy in generating a code profile.

As shown in FIG. 5, a method for application security profiling of a preferred embodiment can include extracting a code property graph from a subset of a code base S110, generating a code profile by from the code property graph S120, and applying the code profile S130. Applying the code profile S130 can include generating a code profile security report S132, augmenting the development process of the base code S134, and/or enforcing a runtime agent according to the code profile S136. The method is preferably implemented in connection with a system as described above, but any suitable system may alternatively be used.

The processes of the method are preferably performed and applied iteratively. The process can be applied on subsections or portions of a base code as well as the whole base code. Additionally, the processes may be applied distributed across an ecosystem of multiple base codes, and thus the process can additionally or alternatively be applied to a subset of base codes. For example, the process may be executed across a set of popular open source software projects as well as in-house proprietary base codes. This iterative application of the method as such can be applied to lower level dependencies of a code base or other related code bases. This can offer better visibility into how different portions of a codebase impact threat exposure and drive development to maintain target security posturing.

Block S110, which includes extracting a code property graph (CPG) from a subset of base codes, functions to analyze statements, data, and elements of a base code and produce an associative model of base code. The CPG is preferably substantially similar to the one described above, where the CPG is a joint data structure or model composed of an abstract syntax tree (AST), a control flow graph (CFG), and a data flow graph (DFG). Accordingly Block S110 can include extracting an AST, a CFG, and a DFG, and assembling the CPG from AST, CFG, and DFG. The AST, CFG, and DFG are each graphs that, in one implementation, joining through statement nodes can form a CPG. The CPG may include a node for each subcomponent for each subject and predicate in the base code. The CPG preferably enables efficient processing and analysis of the base code by enabling efficient graph traversals. The CPG is preferably a serializable data structure, which can enable efficient generating, transmitting, and distributing of the code profile across various machines. Being easily transmitted can enable parallelized processing of the CPG, which can be leveraged in efficient traversal of the CPG in analysis of interaction flows between various points of interest in the codebase. A CPG can additionally be established for different segments and/or dependencies of the code base. For example, block S110 may comprise of extracting CPGs from libraries that are called by the code base and/or distinct subcomponents of the code base. Extracting a CPG for these different segments may additionally help focus and identify locations of interest within the code base. For example, a library CPG may help identify a code base variable that has gone out of its valid parameter range.

Extracting an AST may be a component of extracting a CPG from a subset of base codes S110. The AST functions to characterize the structure and syntax of the code. The AST faithfully encodes how statements and expressions are nested to produce programs. A code parser can create the AST as an ordered tree where inner nodes represent operators and leaf nodes match operands.

Extracting a CFG may be a component of extracting a CPG from a subset of base codes S110. The CFG functions in characterizing the functional flow of execution within the code as well as conditions that need to be met. The control flow graph can preferably represent sequential and/or possible sequences of execution. Extracting the CFG is comprises of creating statement and predicate nodes which are connected by directed edges to indicate transfer of control. A statement node has one outgoing edge, and a predicate node has two outgoing nodes corresponding to true and false evaluation of the predicate. The CFG preferably characterizes the calls between functions in the code and/or the conditional branches within the code. For example, a statement preceding an if-statement will have an association into the if-statement or over the if-statement within the CFG. The CFG may preferably be used to determine the execution flow in base code.

Extracting a DFG may be a component of extracting a CPG from a subset of base codes S110. The DFG functions in tracing the operations and statements that operate on particular pieces of data. Traversing the edges of the graph can indicate the flow of data. The DFG can additionally function in capturing possible operations.

Block S110 can additionally include maintaining the code property graph with changes in the codebase. A versioning tool, such as git, could be integrated with the CPG extraction process by means of continuous integration (CI) tooling, wherein incremental changes in code could trigger updating the CPG for portions of the codebase impacted by the changes. One example of such a versioning tool is Jenkins. These incremental updates can efficiently maintain a substantially updated representation of the codebase during development.

Block S120, which includes generating a code profile from the code property graph, functions to use the CPG, potentially in combination with other analysis processes, in characterizing the codes base properties within a code profile. A resulting code profile can include a number of components that characterize interaction channels, data, interaction flows, dependencies, APIs, various base code meta data, higher-level analysis constructs, and/or other suitable components. Those code profile components can preferably be substantially similar to those described above.

Generating a code profile S120 can preferably include identifying interface channels, classifying data, characterizing dependencies, characterizing APIs, and/or tracing data interactions to interface channels. Generating the code profile preferably utilizes the CPG to understand the relationship of statements and elements of the base code and how they relate based on execution associations. The AST, CFG, and DFG can each be applied in processing and interpreting execution impact of various components of the base code. Impact and exposure of data and/or interface channels can be determined by traversing the CPG and analyzing the handling of those components.

The CPG can provide efficiencies in generating a code profile S120 as compared to generating a code profile directly from the base code. The graph structure of the CPG may convert a code analysis problem into a graph theory problem, potentially reducing the computational power required to solve the problem. That is, because of the graph structure code analysis used in generating the code profile S120, parallel processing in clusters may be implemented to increase the efficiency of the conversion. Computation of a CPG may be split or parallelized by library, dependency, and/or modules of code. Such split computation could be distributed across multiple hardware nodes, which in some cases being commodity hardware. In a preferred implementation, generating the code profile can include loading the CPG in memory, which can function to avoid or reduce access to disk, and SSD seeks on each lookup. The base code of each library or segment of a codebase may be analyzed individually, which can result in efficiencies that may mitigate computational load. This in some implementations can enable use of commodity hardware that the method could be implemented through a cloud-hosted infrastructure. For example, a code profile can be generated for each library and used by the base code, which can minimize the code and/or CPG that needs to be loaded into memory at any one time. As discussed above, the CPG can be serializable, facilitating transmission over a network and replication in the memory of many machines. The feasibility of distribution of the CPG can enable parallelization of various codebase analysis processes. In particular, the generating the code profile S120 will involve the traversal of the CPG in finding the possible flows between various points of interest in the code. This process of traversing the CPG can be segmented and shared across various machines to allow parallel traversals in clusters.

Identifying interface channels functions to identify statements or elements in the codebase that have operations interacting with an outside system. Identifying interface channels preferably includes identifying the type of channel. As described above, interface channel types may relate to interface channels for network access, database access, file interactions, command interactions, and/or other forms of outside system interactions. Identifying an interface channel could additionally classify more detailed properties such as read/write mode indication, description, address, method, protocol, data received, data sent, channels received from, channels sent to, and/or other suitable attributes. During execution or testing of the codebase, usage patterns and/or historical logs relating to the codebase can additionally be stored in association with interface channel components.

Identifying and classifying different classes of data may be required for generating the code profile S120. As described above, data types can include attacker controlled, sensitive data (credit card numbers, SSN, etc.), secrets (e.g., credentials, passwords, etc.), user data, personal identifiable information, user generated data, internal data, public data, and the like. Understanding data types can be used to monitor how critical data types are handled and interact with interface channels. Preferably, natural language processing can be used to analyze class names, object names, structure names, variable names, runtime value patterns, data validation patterns, comments, documents, and/or other aspects, to classify the data within the CPG. Thus, classifying the data. Additionally and/or alternatively, machine learning classifications and heuristic analysis may also be used in identifying and classifying data. Other forms of analysis in classifying data type may also be additionally or alternatively used. In one implementation, classifying can use information based on class naming, object instance naming, data structure naming and organization, variable names, runtime value patterns (e.g., indicated through test, development usage, production usage, and the like), data validation patterns, comments, documentation, and/or other aspects of the codebase. The CPG can be used in identifying associated elements in the code for processing when classifying a data object.

Characterizing dependencies may be required in generating a code profile. Dependencies may include, libraries, modules, projects, or other code based dependencies. Dependencies may, additionally or alternatively, include internal dependencies. Each dependency component may have attributes indicating properties like if its deprecated, classified as insecure or vulnerable, bus factored (high volume of committers added/leaving), unmaintained, license violation, or outdated. Generating a code profile S120 could also be used to generate a code profile of a dependency.

Characterizing APIs may be required in generating a code profile. Characterizing APIs can function to characterize the exposed interface of the code base. API components can be particularly applicable to a library, code module, or application that may expose programmatic interfaces for interactions by other parties. In a library, this can include the exposed function calls for users of the library.

Tracking data interactions to interface channels (i.e., tracing interaction flows) may be required in generating a code profile. Tracing data interactions functions in characterizing the flow of interaction of the profiled components, such as the data and interface channels. Tracing the CFG of the code profile graph may allow tracing the flow of execution and tracing the DFG may allow tracking data, data relationships, and all uses of variables. By traversing the CFG and the DFG the flow data may be incorporated within the code profile. Depending on the modeling architecture, the flows can be modeled as independent components or as properties of the data and/or interface channels as was indicated above. An interaction flow can indicate the interaction channels from which data flows or to which data flows.

Block S130, which includes applying the code profile, functions to use the code profile in some manner. The code profile represents aspects of the codebase that can characterize operations and more specifically operations that relate to the threat surface and code vulnerabilities. Applying the code profile may occur in a variety of ways, such as: generating a code profile security report S132, augmenting the development process of the codebase S134, and/or enforcing a runtime agent according to code profile S136. Additional or alternate way of applying the code profile S130 may also be applicable.

Figure 7:
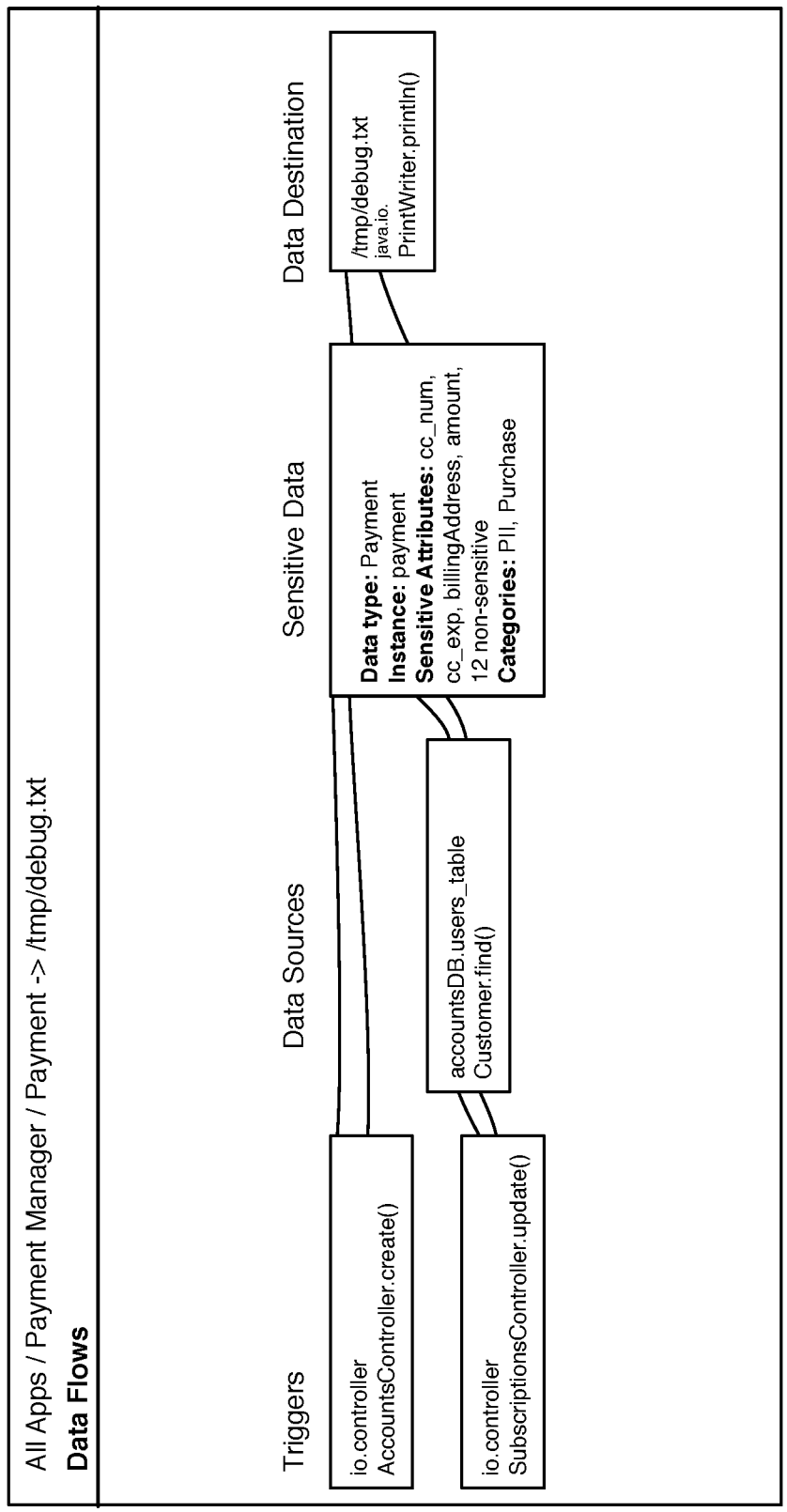
FIGS. 7 and 8 are schematic representation of exemplary security related reports.

Block S132, which includes generating a code profile security report, functions to translate the code profile to a user consumable format. Generating a security report can comprise of querying the code profile and reporting potential vulnerabilities of the base code. For example, the report may include sensitive, attacker controlled data, interface flows, and external dependencies, and any other information that may be of interest to better secure the base code. For example, the relationship of different types of data and the different types of interface channels could be displayed on an interactive dashboard as shown in FIGS. 4 and 7. The code profile security report may function to flag or alert users to certain conditions. For example, the graphical representation could signal an alert or warning when secret data may be output to a network connection. Additionally, in combination with enforcement with a runtime agent. A simple interface could exist to enable different interface channels to be deactivated or otherwise restricted. Those restrictions could also be targeted at particular data types. Other suitable formats and uses of a code profile may be used.

In an ecosystem where the method is implemented widely in the software ecosystem, generating a code profile security report S132 can be used to monitor and represent security vulnerabilities across the ecosystem of software integrations. This may even be used in enabling code profiling across multiple proprietary sets of base codes. For example, a company can understand the security profile impact of using a particular SaaS API despite not having direct visibility into the base code of the SaaS company because of the combined analysis of code profiles of the company and the SaaS company.

In addition to monitoring and securing vulnerabilities, generating a code profile security report S132 may serve as automatically generating compliance documentation. Compliance documentation may be necessary to meet certain national and/or international regulations or standards or audits. For example, compliance documentation may be necessary to conform with the General Data Protection Regulation (GDPR) which is a regulation in EU law on data protection and privacy.

Block S134, which includes augmenting the development process of the codebase, functions to apply the code profile during development. In one variation, a current state of the code profile can be compared to a target code profile that defines a desired security posture for the codebase. A target code profile policy could be defined, provided, or generated. A developer could receive feedback quickly indicating if changes in the code violated any policy guidelines. For example, enforcement of the policy could prevent pushing of code if a data component was newly exposed to a new interface channel because of a change in the code. In another variation, the security impact of individual developers could be tracked and used in scoring or rating security development skills of a developer. Other features could also be introduced to augment the development process.

Figure 8:
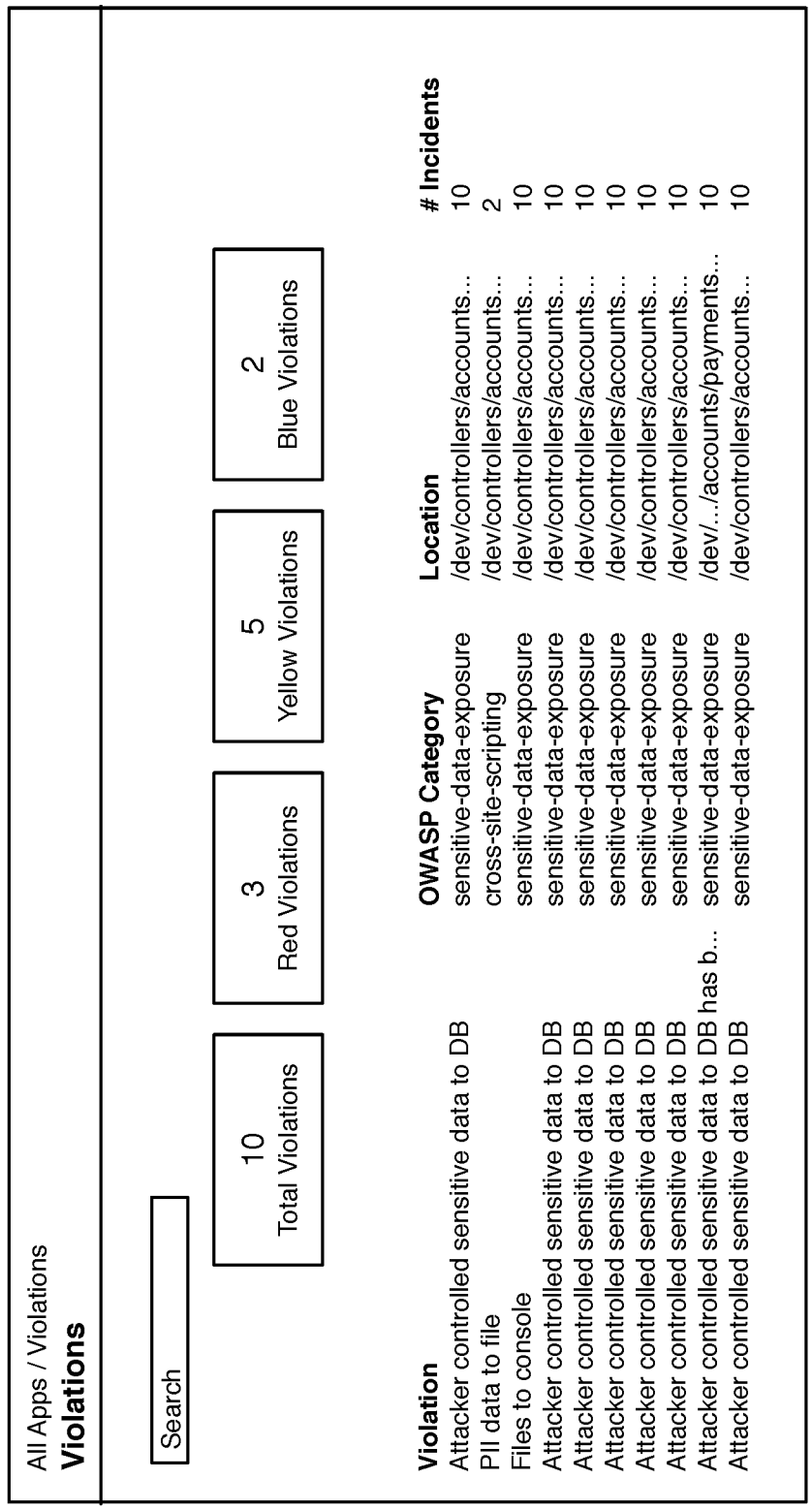

Block S136, which includes enforcing a runtime agent according to the code profile, functions to secure a deployment of the codebase. The runtime agent can preferably instrument a runtime agent thereby creating an enforcement engine that specifically monitors and/or restricts the code base based on the security threat exposure as indicated by the code profile and the underlying CPG, thus looking for application specific vulnerabilities. In one preferred implementation, the runtime agent could be configured to report on activity as it relates to security related activity as shown in FIG. 8. The runtime agent may provide a number of additional traditional security features. Additionally, using the code profile, the runtime agent may take and draw conclusions about the system while it is not running to facilitate runtime efficiency. The runtime may additionally enable dynamic modification of the application that would typically not be possible with the static code profile "picture" of the base code.

The method may further include block S140, obtaining a policy. Obtaining a policy functions as obtaining specifications of how the application communicates with the outside world. In some variations, the policy and/or policy specifications may be preferably incorporated into the generation of the code profile as shown in FIG. 5. Obtaining a policy S140 may include creating support for core language features libraries, and frameworks via policy files. The policy may include additional or alternative features that provide general, or specific, specifications for the application. Obtaining a policy S140 may additionally, or alternatively, include specifying which transformations exist on data, and which information flows should be considered for security violations. Obtaining policy files S140 may comprise of obtaining and employing pre-made policy packages (i.e., default policy rules from a policy database) and/or creating custom policies. Additionally, creating policies may occur through analysis of a code profile (e.g., the code profile for the base code, for dependent modules or libraries, or any alternative base code related objects). Obtaining the policy S140 may additionally include updating and/or modifying the policy as seen fit.

Obtaining a policy S140 for a set of base code may occur in an iterative manner. For example. A policy for the code base could be initially created from the code profile of a dependent library. As the code is being developed and hierarchies of code develop on top of each other, obtaining a policy S140 may comprise of modifying and or including specifications from a subset of the total base code and its dependencies. In this manner obtaining a policy S140 may focus on specific vulnerabilities of the application it is used to secure.

In methods that include obtaining a policy S140, generating a code profile S120 from the CPG further includes following the policy specifications in generating the code profile. Depending on the base code, different policies may be obtained. For general data-flow related vulnerabilities, the method may preferably employ a default policy for known libraries. The policy may define methods that introduce data into the application, sensitive operations, and dataflow that should be reported. The security policy may be a more concise method of identifying generally sensitive operations. The policy may additionally allow data transformations and checks to be specified in order to report flows of data (e.g., performing checks for only unvalidated data).

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

The invention claimed is:

1. A method for application security profiling comprising of:
    extracting a code property graph from at least a subset of a code base comprises initially extracting an abstract syntax tree subcomponent, control flow graph subcomponent, and a data flow graph subcomponent from the code base, and extracting a code property graph from the abstract syntax tree subcomponent, the control flow graph subcomponent, and the data flow graph subcomponent;
    generating a code profile from the code property graph, wherein generating the code profile occurs prior to a compilation of the code base; and
    applying the code profile, comprising of identifying sections of interest within the code base.

2. The method of claim 1, wherein extracting a code property graph further comprises of maintaining the code property graph with changes to the code base.

3. The method of claim 1, further comprises of creating a code policy, wherein the policy is a formal specification for generating a code profile; and wherein generating a code profile further comprises of generating the code profile from the code based graph and the policy.

4. The method of claim 3, wherein creating the code policy comprises of receiving user input specifying at least a portion of the code policy.

5. The method of claim 3, wherein creating the code policy comprises of iteratively applying an application security profiling method to the code base.

6. The method of claim 5, wherein iteratively applying the method comprises of applying the method to lower level dependencies of the code base.

7. The method of claim 1, wherein generating the code profile comprises of classifying data types and functions.

8. The method of claim 7, wherein classifying data types comprises of classifying sensitive data.

9. The method of claim 7, wherein classifying data types comprises of classifying attacker controlled data and unvalidated user data.

10. The method of claim 1, wherein generating the code profile further comprises of traversing the code profile graph and identifying flows between various points of the code base.

11. The method of claim 1, wherein extracting a code property graph further comprises of extracting a code property graph from a subset of multiple code bases.

12. The method of claim 11, wherein generating a code profile further comprises of generating a code profile for a subset of multiple code bases.

13. The method of claim 1, wherein extracting a code property graph further comprises parallelizing computation of the code property graph across multiple computational nodes.

14. The method of claim 1, wherein applying the code profile occurs prior to application runtime.

15. The method of claim 1, wherein applying the code profile further comprises of generating a code profile report.

16. The method of claim 1, wherein applying the code profile further comprises of augmenting the development process of the code base by implementing code specific recommendations from the code profile.

17. The method of claim 1, wherein applying the code profile further comprises of implementing a dynamic code-specific runtime agent.

18. A method for application security profiling comprising of:
- extracting a code property graph from a subset of a code base, wherein extracting a code property graph comprises of:
  - extracting an abstract syntax tree subcomponent,
  - extracting a control flow graph subcomponent,
  - extracting a property graph subcomponent, and
  - forming a joint data structure of the three subcomponents such that each subcomponent has a node for each subject and predicate of the base code;
- generating a code profile, by traversing the code property graph, thereby:
  - identifying interface channels, wherein interface channels characterize the input/output associated operations of the code base,
  - classifying data types and functions,
  - characterizing code based dependencies, by tracing the flow of data using the data flow graph,
  - characterizing the exposed interfaces of the code base, by tracing the flow of interfaces using the control flow graph, and
  - wherein generating the code profile occurs prior to a compilation of the code base; and
- applying the code profile, comprising of identifying locations of interest within the base code.

19. The method of claim 18, further comprising of obtaining a code policy, a formal specification for generating the code profile, wherein generating the code profile further comprises of implementing the specifications of the policy into at least one of the code profile subcomponents, thereby generating a code profile that comprises of subcomponents and flow interactions of interest.

* * * * *